United States Patent [19]

Honaga et al.

[11] 4,361,166

[45] Nov. 30, 1982

[54] FLOW CONTROLLING APPARATUS FOR POWER STEERING, OPERATING FLUID

[75] Inventors: Susumu Honaga, Aichi; Akihiko Sato, Okazaki, both of Japan

[73] Assignee: Toyoda Koki Kabushiki Kaisha, Kariya, Japan

[21] Appl. No.: 225,263

[22] Filed: Jan. 15, 1981

[30] Foreign Application Priority Data

Jan. 24, 1980 [JP] Japan .................................. 55-7541
Jun. 6, 1980 [JP] Japan .................................. 55-76949

[51] Int. Cl.³ ............................................ G05D 11/00
[52] U.S. Cl. ................................ 137/117; 137/454.5; 138/45
[58] Field of Search ............... 138/45, 46; 137/117, 137/517, 454.5

[56] References Cited

U.S. PATENT DOCUMENTS

| | | | |
|---|---|---|---|
| 2,678,066 | 5/1954 | Carter | 138/45 |
| 2,771,093 | 11/1956 | Wilson | 137/454.5 |
| 2,789,576 | 4/1957 | Mitchell | 137/117 |
| 3,024,798 | 3/1962 | Banker | 137/117 |
| 3,217,732 | 11/1965 | Haugeland | 137/117 |
| 3,426,785 | 2/1969 | Brady et al. | 137/117 |
| 3,575,192 | 4/1971 | MacDuff | 137/117 |
| 3,581,760 | 6/1971 | West | 137/117 |
| 3,592,237 | 7/1971 | Borschers | 138/46 |
| 3,714,964 | 2/1973 | Livinston | 138/45 |
| 4,262,844 | 4/1981 | Sekiya | 138/45 |

Primary Examiner—H. Jay Spiegel

[57] ABSTRACT

A hydraulic fluid discharged from a pump is delivered to a power steering device from a supply passage through a restricted passage and a throttled passage so that as the flow through the supply passage increases in response to an increase in the number of revolutions of the pump, the flow path resistance presented by the restricted passage increases the pressure prevailing in the supply passage to cause a control spool to control the flow area of the throttled passage, thus decreasing the flow delivered to the power steering device. In this manner, a constant and invariable flow decrease characteristic can be maintained despite a loading pressure upon the power steering device, thus enhancing the stability under high speed running conditions. A mechanism to provide a variable control of the flow delivered to the power steering device is provided in a union which is fixedly mounted in one end of a bore in a pump housing.

3 Claims, 5 Drawing Figures

FLOW CONTROLLING APPARATUS FOR POWER STEERING, OPERATING FLUID

BACKGROUND OF THE INVENTION

The invention relates to a flow controlling apparatus for use with a power steering device in which a hydraulic fluid discharged from a pump is delivered to a power steering device through a throttled passage and an excess flow is returned to the suction side of the pump through a bypass passage, and more particularly, to such flow controlling apparatus which reduces the flow delivered to the power steering device as the number of revolutions of the pump increases.

A pump unit which is used in a power steering device of an automobile is provided with a flow regulating valve, which operates to maintain a constant flow to the power steering device by increasing the flow area of the bypass passage as the running speed of the automobile and hence the number of revolutions of the pump increases, thereby bypassing the majority of the flow discharged from the pump to the suction side thereof. When the automobile is running at a high speed, it is required that the steering reaction sensed by a driver be increased as the running speed increases, and at this end, the control flow to the power steering device is reduced in response to an increase in the number of revolutions of the pump. This also contributes to a power saving when the vehicle is running at a high speed.

However, many of conventional flow controlling apparatus of this kind is arranged to control the throttled passage having a variable area in accordance with a displacement of the flow regulating valve. This allows a predetermined flow decrease characteristic to be achieved during the time the power steering device is not loaded, but when the pressure is applied in order to operate the power steering device, the flow regulating valve functions to restrict the bypass flow, thus unfavourably causing a restoration of the flow which has once been decreased.

SUMMARY OF THE INVENTION

It is an object of the invention to permit a variable control of a throttled passage in accordance with an increase in the discharge flow from a pump as the number of revolutions thereof increases and independently from a displacement of a spool valve which is used to regulate the flow, thus preventing a restoration of the flow when the pressure is applied to a power steering device.

It is another object of the invention to provide a union in which the variable flow controlling capability is assembled, facilitating its application to an existing power steering system and allowing a simplification of the arrangement.

In accordance with the invention, there is provided a throttled passage which feeds a hydraulic fluid to a power steering device, and the flow area of the passage is controlled in accordance with an increase in the discharge flow from a pump as the number of revolutions thereof increases and independently from a displacement of a spool valve which is utilized to regulate the flow. In this manner, the flow, which has once decreased with an increasing number of revolutions of the pump, is prevented from restoring as the load pressure on the power steering device increases.

DESCRIPTION OF EMBODIMENTS

Figure 1:
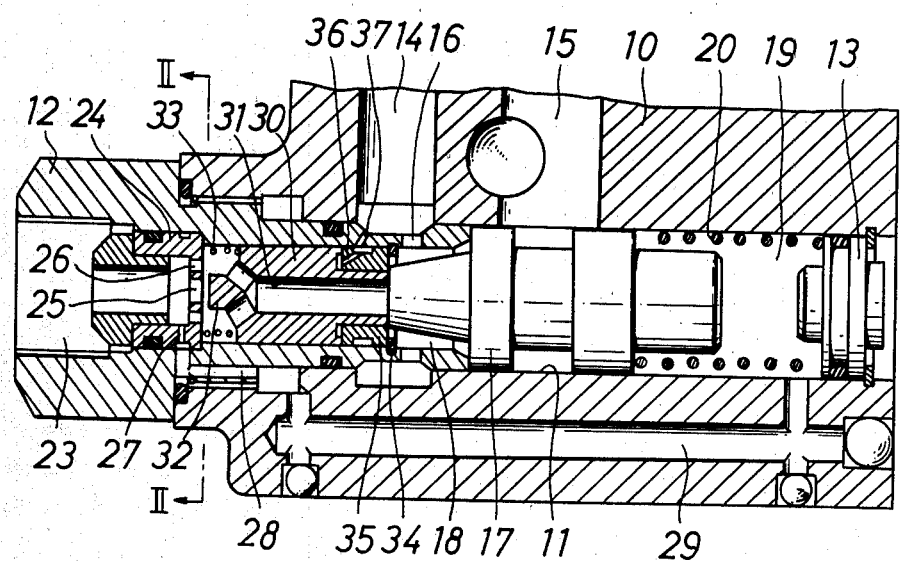
FIG. 1 is a cross section of a flow control apparatus of the invention which controls the flow of an operating fluid utilized for power steering purpose.
Figure 2:
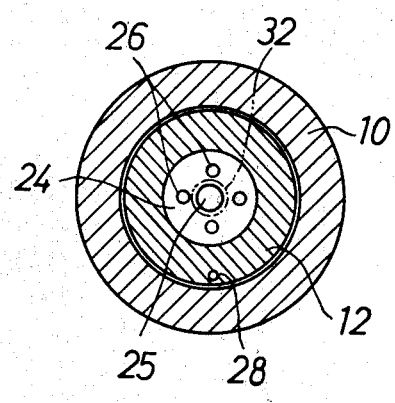
FIG. 2 is a cross section taken along the line II—II shown in FIG. 1.

Referring to FIG. 1, the flow control apparatus according to one embodiment of the invention includes a pump housing 10, through which a bore 11 extends to receive a valve therein. A union 12 is threadably engaged with one end of the bore 11 while a plug 13 is fitted in the other end thereof. The union 12 is substantially cylindrical in configuration having one end projecting into the bore 11. A hydraulic fluid delivery port 23 is formed in the other end of the union for connection with a normally open servo valve unit of an associated power steering device. Both a supply passage 14 and a bypass passage 15 open into the bore 11 at axially spaced points, and the supply passage 14 is normally maintained in communication with the bore 11 through a restricted passage 16 which is formed in the union 12. The restricted passage 16 is constructed such that as the discharge flow from a pump which is supplied to the passage 14 increases, the flow path resistance developes a pressure differential between the upstream and the downstream side, that is, between the supply passage 14 and the bore 11. While not shown, the supply passage 14 is connected in communication with the discharge chamber of the pump while the bypass passage 15 is connected in communication with the suction chamber of the pump.

A flow regulating spool valve 17 is slidably disposed in the bore 11 to permit the communication between the both passages 14, 15 to be closed or the degree of such communication to be adjusted. A first and a second valve chamber 18, 19 are defined on the opposite sides of the spool valve 17. A spring 20 is disposed in the second valve chamber 19 for urging the spool valve 17 toward the first valve chamber 18, and its resilience normally maintains the spool valve 17 in abutment against one end of the union 12, thus interrupting the communication between the supply passage 14 which opens into the first valve chamber 18 and the bypass passage 15.

A throttle member 24 is fitted into the union 12 at a location close to the delivery port 23, and is centrally formed with a first restricted passage 25 which enables a communication between the first valve chamber 18 and the delivery port 23 to be established through a fluid passage to be described later. The throttle member 24 is also formed with a second restricted passage 26 which comprises a plurality of small apertures located around the first restricted passage 25 and providing a communication between the first valve chamber 18 and the delivery port 23 through the fluid passage mentioned above. In this manner, a communication between the first valve chamber 18 and the delivery port 23 is established through the pair of restricted passages 25, 26 which are disposed in parallel relationship with each other. The first restricted passage 25 is suitably controlled or closed by a control spool to be described later. A control nozzle 27 opens into the bore 11 at a location intermediate the throttle member 24 and the delivery port 23, and communicates with the second valve chamber 19 through openings 28, 29 formed in the union 12 and the pump housing 10, respectively. As a result, the fluid which has passed through the restricted passages 25, 26 is introduced into the second valve chamber 19, and thus the fluid pressure before and after passing through the restricted passages 25, 26 are applied to the both end faces of the spool valve 17 to move it axially in accordance with a pressure drop across the restricted passages 25, 26. In this manner, the opening of the bypass passage 15 is adjusted so as to maintain the pressure drop across the restricted passages 25, 26 constant.

A control spool 30 is slidably fitted inside the union 12, and has a fluid passage 31 extending therethrough which provides a communication between the first valve chamber 18 and the restricted passages 25, 26. One end of the control spool 30 is formed with a control stem 32 which is adapted to control the opening and closing of the restricted passage 25. A compressed spring 33 is interposed between the control spool 30 and the throttle member 24, thereby urging the control spool into and maintaining it in abutment against an abutment block 35 which is locked in place by a retainer ring 34 fitted inside the union 12. In this manner, the control stem 32 of the spool 30 is normally spaced from the throttle member 24 to maintain the first restricted passage 25 open. Pressure introducing openings 36 are formed in the abutting surfaces of the control spool 30 and the abutment block 35 in isolated relationship from the fluid passage 31, and communicate with the supply passage 14 through a hole 37 formed in the union 12. The hole 37 has a reduced diameter to provide a damping effect which prevents the control spool 30 from oscillating in response to fluctuations in the supply pressure.

In operation, when the pump rotor is driven for rotation by an engine of the automobile, the operating fluid contained in the suction chamber is withdrawn into the pump chamber through an intake port, and a pressurized fluid is discharged into the discharge chamber through a discharge port. The hydraulic fluid discharged into the discharge chamber is fed through the supply passage 14 and thence through the restricted passage 16 to the first valve chamber 18 defined in the bore 11. Subsequently, the hydraulic fluid is fed from the first valve chamber 18 to the power steering device through a path including the fluid passage 31 and the first and the second restricted passages 25, 26 and the delivery port 23.

While the rotational speed of the pump is low, the pump discharges a reduced amount of flow, and hence the spool valve 17 maintains the bypass passage 15 closed while the entire discharge flow from the pump is delivered to the power steering device through the both restricted passages 25, 26. As the rotational speed of the pump increases to increase the discharge flow, the pressure differential across the restricted passages 25, 26 is maintained constant by a sliding movement of the spool valve 17, which then opens the bypass passage 15, thus returning an excess amount of flow to the bypass passage 15. In this manner, the amount of hydraulic fluid delivered to the power steering device is maintained at a given value Q1 which is determined by the pair of restricted passages 25, 26.

Figure 4:
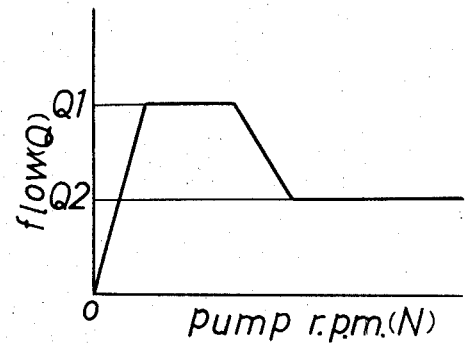
FIG. 4 graphically illustrates a flow characteristic as a function of the number of revolutions of the pump.
Figure 3:
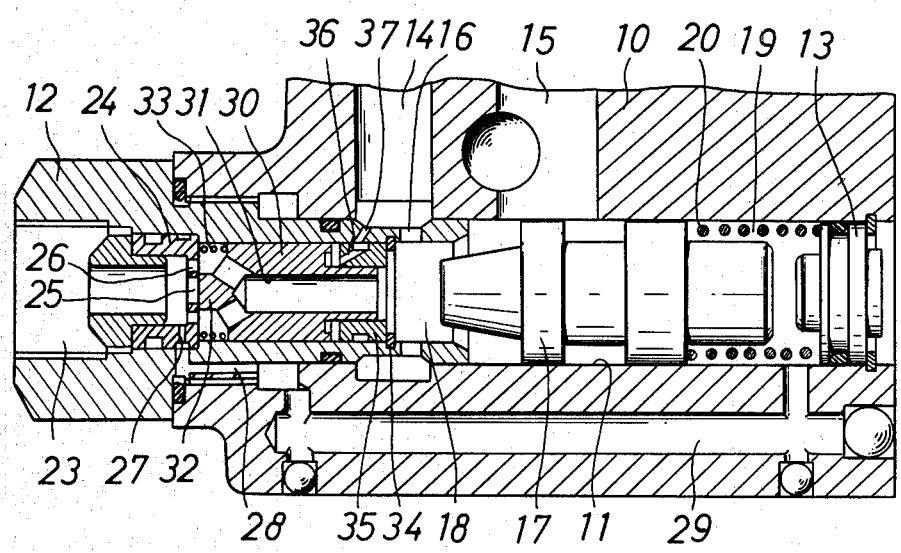
FIG. 3 is a similar view to FIG. 1, illustrating the operating condition of the apparatus shown in FIG. 1.

In response to a gear shift to a higher speed of running of the automobile, the number of revolutions of the pump further increases to thereby increase the discharge flow from the pump which is fed to the supply passage 14. At this time, the flow path resistance presented by the restricted passage 16 causes an increase in the hydraulic pressure in the supply passage 14, thus developing a pressure differential between the first valve chamber 18 and the supply passage 14. The pressure prevailing in the supply passage 14 is introduced into openings 36, formed in the abutting surfaces of the control spool 30 and the abutment block 35, through the hole 37, thereby applying an axial thrust upon the control spool 30 which opposes the resilience of the spring 33. When the pressure prevailing in the supply passage 14 increases, as the discharge flow from the pump increases, to a point where the axial thrust overcomes the resilience of the spring 33, the control spool 30 begins to be displaced against the resilience of the spring 33. As a result, the first restricted passage 25 is gradually restricted by the control stem 32 of the spool 30 until it is eventually closed as shown in FIG. 3. At this time, the communication between the first valve chamber 18 and the delivery port 23 is established through only the second restricted passage 26, so that the amount of hydraulic fluid delivered to the power steering device is reduced to another given value Q2 which is determined by the second restricted passage 26, as graphically shown in FIG. 4. In this manner, when the automobile is running at a higher speed, the driver of the automobile can enjoy a steering reaction which is achieved by a reduction in the flow supplied to the power steering device to thereby enhance the high speed stability while accomplishing a power saving when the vehicle is running at the high speed.

When the power steering device is actuated when the automobile is running at a high speed, there is applied a pressure which depends on the steering resistance and which causes the spool valve 17 to be displaced in a direction to close the bypass passage 15 in accordance with the magnitude thereof, so that in the conventional arrangement in which the flow is reduced in accordance with the displacement of the spool valve, the flow which has once been reduced is restored again as the loading pressure upon the power steering device increases. However, in accordance with the invention, a flow decrease characteristic can be invariably maintained despite an increasing loading pressure upon the power steering device since one of the pair of the restricted passages 25, 26 is controlled independently from a displacement of the spool valve 17 or in accordance with the pressure which corresponds to the flow path resistance presented by the restricted passage 16 as the discharge flow from the pump increases.

Figure 5:
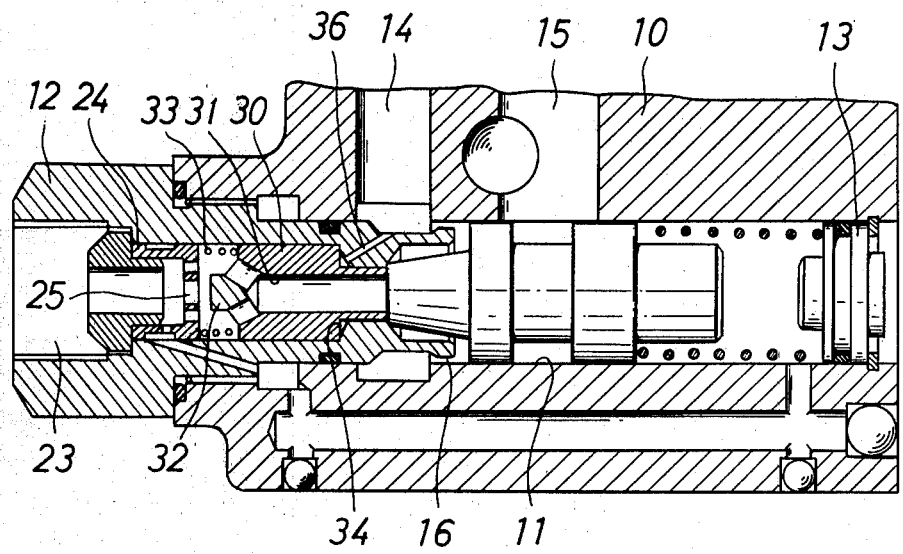
FIG. 5 is a cross section of a flow control apparatus according to another embodiment of the invention.

Referring to FIG. 5, there is shown another embodiment of the invention. As before, a pump housing 10 is formed with a bore 11 which receives a valve therein. A union 12 is threadably engaged with one end of the bore 11 while a plug 13 is fitted into the other end thereof. The union 12 is substantially cylindrical in configuration having its inner end loosely fitted into the bore 11. A hydraulic fluid delivery port 23 is formed in the other end of the union 12 for connection with a normally open servo valve unit of a power steering device. A supply passage 14 and a bypass passage 15 both open into the bore 11 at axially spaced points, and the supply passage 14 normally communicates with the interior of the bore 11 through an annular restricted passage 16 defined between the outer periphery of the inner end of the union 12 and the bore 11. As the discharge flow from the pump which is supplied to the supply passage 14 increases, a flow path resistance of the restricted passage 16 produces a pressure differential between its upstream and downstream side, namely, between the supply passage 14 and the interior of the bore 11.

A control spool 30 is slidably disposed in the union 12 and is normally urged by a spring 33 to a position where the control spool 30 is locked against the step 34 formed in the union 12. In this manner, a control stem 32 of the control spool 30 is spaced from a throttle member 24, thus maintaining a first restricted passage 25 open. A pressure introducing opening 36 is formed in the union 12 at a location spaced from a fluid passage 31, and opens into the abutting surface of the union step 34 against the control spool 30, the opening 36 providing a damping effect. It will be noted that the opening 36 communicates with the supply passage 14.

As discussed, in accordance with the invention, a hydraulic fluid discharged from the pump is delivered to a power steering device from the supply passage through the restricted passage and throttled passage so that as the flow through the supply passage increases in response to an increase in the number of revolutions of the pump, the flow path resistance presented by the restricted passage increases the pressure prevailing in supply passage to cause the control spool to control the flow area of the throttled passage, thus decreasing the flow delivered to the power steering device. In this manner, a constant and invariable flow decrease characteristic can be maintained despite a loading pressure upon the power steering device, thus enhancing the stability under high speed running conditions.

Since the mechanism to provide a variable control of the flow delivered to the power steering device is provided in the union which is fixedly mounted in one end of the bore in the pump housing, the construction can be simplified. In addition, a mere replacement of another union permits a change from a standard pump to the type of pump which is responsive to the number of revolutions in a facilitated manner.

What is claimed is:

1. A flow control apparatus for supplying pressurized fluid from an engine-driven pump to a power steering device and for returning an excess part of said pressurized fluid directly to said pump, comprising:
   a housing;
   a bore formed in said housing;
   a supply passage formed in said housing to be opened into said bore for supplying said pressurized fluid from said engine-driven pump;
   a bypass passage formed in said housing to be opened into said bore in spaced relationship with said supply passage for returning an excess part of said pressurized fluid directly to said pump;
   a spool valve slidably received in said bore for controlling communication between said supply passage and said bypass passage;
   first spring means disposed in said bore for urging said spool valve in a direction toward said supply passage;
   a union fixedly secured to one end of said bore and having an inner portion extending inwardly of said bore toward said spool valve;
   restricted passage means formed between said supply passage and said spool valve for causing a pressure differential thereacross as the flow of said pressurized fluid in said supply passage increases;
   a throttle member fixedly inserted in said union and formed with first and second restricted passages;
   a control spool slidably received in said union between said throttle member and said inner portion of said union and formed with a first fluid passage for fluidically communicating with said restricted passage means and said throttle member;
   second spring means interposed in said union between said throttle member and said control spool for urging said control spool in a direction away from said throttle member;
   said control spool being formed with a control stem to close said first restricted passage of said throttle member when said control spool is moved into abutment with said throttle member against said second spring means;
   a delivery port formed in said union downstream of said throttle member and fluidically communicated with said power steering device;
   a second fluid passage formed in said housing for fluidically communicating said first spring means-disposed bore with said delivery port so as to move said spool valve in response to a pressure differential across said throttle member; and
   a third fluid passage formed on said inner portion of said union for applying said pressurized fluid in said supply passage to said control spool against said second spring means.

2. A flow control apparatus according to claim 1, wherein said inner portion of said union is fitted in said bore between said supply passage and said bypass passage, and wherein said restricted passage means comprises a third restricted passage on said inner portion of said union.

3. A flow control apparatus according to claim 1, wherein said inner portion of said union is reduced in diameter relative to said bore, and wherein said restricted passage means is formed between said inner portion of said union and said bore.

* * * * *